May 23, 1967 — B. B. GEMENY — 3,321,141
ADJUSTABLE LAWN SPRINKLER
Filed Oct. 22, 1965

BLAINE B. GEMENY
INVENTOR.

BY

ATTORNEY

United States Patent Office 3,321,141
Patented May 23, 1967

3,321,141
ADJUSTABLE LAWN SPRINKLER
Blaine B. Gemeny, 1009 W. 25th St., Apt. A,
Austin, Tex. 78705
Filed Oct. 22, 1965, Ser. No. 500,502
3 Claims. (Cl. 239—515)

This invention relates to lawn sprinklers and has reference to that type of sprinkler having an adjustable collar for regulating the diameter of the spray.

While sprinklers of the general type referred to are known to the art, they have not been completely satisfactory. Either they contained rotary baffles or were otherwise expensive to manufacture and maintain; or, if of simple construction, they did not produce a really fine spray.

An object of the invention is to provide a lawn sprinkler of simple and inexpensive construction which will break up streams of water from a multiple opening nozzle to produce a finer spray than comparable prior devices.

A further object is to provide a lawn sprinkler which will sprinkle a larger area than other sprinklers of the same size and comparable construction.

Another object of the invention is to provide, in addition to the foregoing, a threaded collar for regulating the diameter of the area sprinkled.

A particular object of the invention is to provide beveled teeth around the upper periphery of the collar and arranged to break up jets of water into a fine spray without the use of revolving parts which are subject to wear and add to the original cost and maintenance.

These and other objects of the invention will become apparent from the following description and the accompanying drawing, in which.

Figure 2:
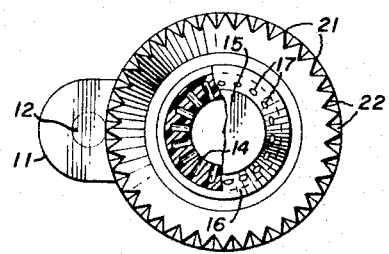
FIGURE 2 is a top plan and broken sectional view.
Figure 1:
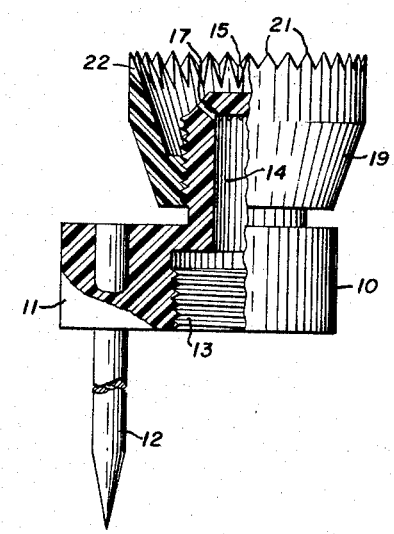
FIGURE 1 is an elevational and broken sectional view of a lawn sprinkler according to the invention.

The construction shown includes a circular base 10 having an integral lateral projection 11 and a depending spike 12 extending therethrough. In the bottom of the base 10, and concentric therewith, there are threads 13 of a size to receive the threaded end of an ordinary garden hose, not shown. Integral with the base 10, and communicating with the opening defined by the threads 13, there is an upstanding nozzle member 14 having a closed end 15. The upper end of the nozzle member 14 is beveled, at 16, and through which there are upwardly and outwardly disposed radial ports 17.

Figure 3:
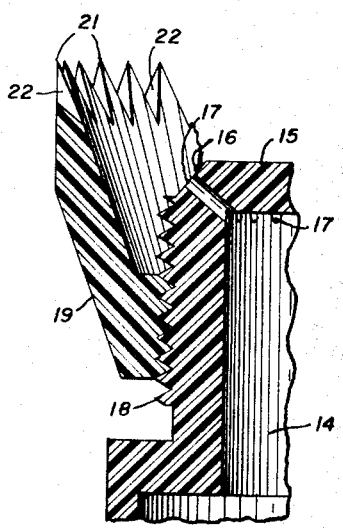
FIGURE 3 is an enlarged vertical broken sectional view of the collar and nozzle and showing the optimum arrangement of the teeth on the collar relative to the nozzle ports.

There are threads 18 around the nozzle member 14 on which is threaded a cup shaped collar 19 having an upward and outwardly sloped inner wall 20. Around the periphery of the collar there are upstanding pointed teeth 21, the adjacent surfaces of which are beveled downwardly and inwardly at 22. In the preferred construction of the invention, there are at least twice as many teeth 21 as there are nozzle ports 17. In its optimum operating position, FIGURE 3, there are two adjacent beveled surfaces 22 opposite each nozzle port 17 for diffusing jets of water therefrom. This optimum position is attained by turning the collar 19 on the threads 18 of the nozzle member 14.

Figure 4:
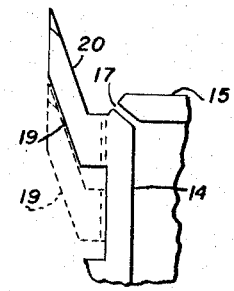
FIGURE 4 is a schematic view similar to FIGURE 3 and showing an adjusted position of the collar by means of dotted lines.

When the teeth 21 of the collar 19 are below the jets of water from the nozzle 14, as shown by dotted lines, FIGURE 4, the sprinkler operates as an ordinary sprinkler. When the collar 19 is raised to a position where the jets strike the sloped wall 20, a small diameter of spray is effected. However, when the jets strike the beveled surfaces 22 of the teeth 21, a fine spray of large diameter is created.

As shown, the base 10, projection 11 and collar 19 are of molded plastic, for example polyethylene. While the pointed spike 12 is ordinarily stuck in the ground, it is to be understood that the described construction may be used for hand watering a lawn.

The invention is not limited to the exemplary construction herein shown and described, but may be made in various ways within the scope of the appended claims.

What is claimed is:

1. A lawn sprinkler comprised of a base, a threaded opening in said base, a cylindrical nozzle member on said base in communication with said threaded opening, the end of said nozzle member opposite said threaded opening being closed, outwardly and angularly disposed radial ports in said nozzle member around said closed end, a cup shaped collar threadedly mounted on said nozzle member, and teeth around the periphery of said cup shaped collar.

2. A lawn sprinkler as defined in claim 1, and wherein the inner wall of said cup shaped collar is outwardly sloped to the periphery thereof.

3. A lawn sprinkler as defined in claim 1, and wherein the adjacent surfaces of said teeth are beveled around the inner wall of said cup shaped collar.

References Cited by the Examiner

UNITED STATES PATENTS

| | | | |
|---|---|---|---|
| 2,573,904 | 11/1951 | Grossman | 239—460 |
| 2,840,152 | 6/1958 | Reed | 239—498 |
| 3,116,018 | 12/1963 | Kunz | 239—460 |
| 3,189,284 | 6/1965 | Downey | 239—460 |

M. HENSON WOOD, Jr., *Primary Examiner.*

M. MAR, *Assistant Examiner.*